(12) United States Patent
Li

(10) Patent No.: US 10,410,621 B2
(45) Date of Patent: Sep. 10, 2019

(54) TRAINING METHOD FOR MULTIPLE PERSONALIZED ACOUSTIC MODELS, AND VOICE SYNTHESIS METHOD AND DEVICE

(71) Applicant: BAIDU ONLINE NETWORK TECHNOLOGY (BEIJING) CO., LTD., Beijing (CN)

(72) Inventor: Xiulin Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/758,280

(22) PCT Filed: Jun. 27, 2016

(86) PCT No.: PCT/CN2016/087321
§ 371 (c)(1),
(2) Date: Mar. 7, 2018

(87) PCT Pub. No.: WO2017/067206
PCT Pub. Date: Apr. 27, 2017

(65) Prior Publication Data
US 2018/0254034 A1 Sep. 6, 2018

(30) Foreign Application Priority Data
Oct. 20, 2015 (CN) .......................... 2015 1 0684475

(51) Int. Cl.
*G10L 13/02* (2013.01)
*G10L 15/02* (2006.01)
(Continued)

(52) U.S. Cl.
CPC .............. *G10L 13/02* (2013.01); *G10L 13/08* (2013.01); *G10L 15/02* (2013.01); *G10L 15/04* (2013.01);
(Continued)

(58) Field of Classification Search
CPC ......... G10L 13/02; G10L 13/08; G10L 15/02; G10L 15/04; G10L 15/063; G10L 15/142;
(Continued)

(56) References Cited

U.S. PATENT DOCUMENTS

| | | |
|---|---|---|
| 2014/0324435 A1 | 10/2014 | Bellagarda |
| 2015/0012277 A1 | 1/2015 | Stephens et al. |

FOREIGN PATENT DOCUMENTS

| | | |
|---|---|---|
| CN | 1534595 | 10/2004 |
| CN | 101308652 | 11/2008 |
| CN | 101751921 | 6/2010 |
| CN | 103117057 | 5/2013 |

(Continued)

OTHER PUBLICATIONS

Fan et al., Multi-Speaker Modeling and Speaker Adaptation for DNN- Based TTS Synthesis, Apr. 2015, IEEE, all (Year: 2015).*

(Continued)

*Primary Examiner* — Sonia L Gay
(74) *Attorney, Agent, or Firm* — Hodgson Russ LLP

(57) ABSTRACT

A training method for multiple personalized acoustic models, and a voice synthesis method and device, for voice synthesis. The method comprises: training a reference acoustic model, based on first acoustic feature data of training voice data and first text annotation data corresponding to the training voice data (S11); acquiring voice data of a target user (S12); training a first target user acoustic model according to the reference acoustic model and the voice data (S13); generating second acoustic feature data of the first text annotation data, according to the first target user acoustic model and the first text annotation data (S14); and training a second target user acoustic model, based on the first text annotation data and the second acoustic feature data (S15).

12 Claims, 6 Drawing Sheets

(51) Int. Cl.
  *G10L 15/183* (2013.01)
  *G10L 15/04* (2013.01)
  *G10L 15/06* (2013.01)
  *G10L 15/18* (2013.01)
  *G10L 15/14* (2006.01)
  *G10L 13/08* (2013.01)

(52) U.S. Cl.
  CPC .......... *G10L 15/063* (2013.01); *G10L 15/142* (2013.01); *G10L 15/183* (2013.01); *G10L 15/1807* (2013.01); *G10L 2015/0631* (2013.01)

(58) Field of Classification Search
  CPC ............... G10L 15/1807; G10L 15/183; G10L 2015/0631
  See application file for complete search history.

(56) References Cited

FOREIGN PATENT DOCUMENTS

| | | |
|---|---|---|
| CN | 105185372 | 12/2015 |
| CN | 105206258 | 12/2015 |
| CN | 105261355 | 1/2016 |

OTHER PUBLICATIONS

Potard et al., Preliminary Work on Speaker Adaptation for DNN-Based Speech Synthesis, Jan. 2015, idiap, all (Year: 2015).*
Wu et al., A Study of speaker adaptation for DNN-based speech synthesis, Sep. 6-10, 2015, ISCA, all (Year: 2015).*
WIPO, ISR for PCT/CN2016/087321, dated Sep. 14, 2016.

* cited by examiner

TRAINING METHOD FOR MULTIPLE PERSONALIZED ACOUSTIC MODELS, AND VOICE SYNTHESIS METHOD AND DEVICE

CROSS-REFERENCE TO RELATED APPLICATION

This application is a U.S. national phase application of International Application No. PCT/CN2016/087321, filed on Jun. 27, 2016, which claims priority to and benefits of Chinese Patent Application Serial No. 201510684475.1, filed with the State Intellectual Property Office of P. R. China on Oct. 20, 2015, the entire content of which is incorporated herein by reference.

FIELD

The present disclosure relates to a speech technology field, and more particularly to a method and a device for training personalized multiple acoustic models for speech synthesis, and a method and a device for speech synthesis.

BACKGROUND

Speech synthesis, also known as text to speech technology, is a technology that can transform text information into a speech and read it. The speech synthesis is a frontier technology in a field of Chinese information processing, involving many subjects, such as acoustics, linguistics, digital signal processing, computer science, and the like, having a main problem of how to transform text information into audible sound information.

In a speech synthesis system, a process of transforming the text information into the sound information is explained as follows. Firstly, it needs to process input text, including pre-processing, word segmentation, part-of-speech tagging, polyphone prediction, prosodic hierarchy prediction, and the like, then to predict acoustic features of each unit via an acoustic model, and finally, to directly synthesize a voice via a vocoder using the acoustic parameters, or to select units from a recording corpus base and splice them to generate sound information corresponding to the text.

The acoustic model is one of foundations of the whole speech synthesis system. The acoustic model is usually obtained by training a large-scale speech data. A process of training the acoustic model is explained as follows. Firstly, a certain number of recording text corpuses are designed to meet requirements of phones coverage and prosody coverage. Secondly, suitable speakers are selected, and the speakers record speech data accordingly. Then, annotation of text, Chinese phoneticize, prosody, and unit boundary is performed, and annotated data is used for model training and speech base generation. It can be seen that, the process of training an acoustic model is complex, and takes a long time, and the training process is based on speech data of fixed speakers, therefore, timbre of synthesized speech is fixed in the process of speech synthesis using the acoustic model.

However, it is wished that own voice, voice of a family member or a friend, or voice of a star is used for speech synthesis in many cases, that is, the user wish the speech synthesized by the speech synthesis system to have personalized speech features. In order to meet requirements for personalized speech, there are mainly following two modes for obtaining a personalized acoustic model in the related art.

The first mode is to train the personalized acoustic model that the user needs at an acoustic parameter level using parallel corpus or non-parallel corpus.

The second mode is to use a mapping between models to realize transformation between a reference acoustic model and a personalized acoustic model. In detail, hidden Markov models and Gaussian mixture models (HMM-GMM for short) are used for modeling, and mappings between decision trees are performed, so as to generate the personalized acoustic model.

However, in a process of realizing the present disclosure, the inventors find there are at least following problems in the related art.

For the first mode, there are two branches as follows. (1) When the personalized acoustic model is trained at the acoustic parameter level using the parallel corpus, it requires two speakers to generate original speech according to a same text, which is sometimes impractical. When using the parallel corpus, a requirement for a scale of corpus may be high, required time is long, and the processing volume is large, such that it is difficult to obtain the personalized acoustic model rapidly. (2) When the personalized acoustic model is trained at the acoustic parameter level using the non-parallel corpus, the two speakers generate the original speech according to different text, and there is obvious difference between pronunciations in different sentence environments for a same syllable. Therefore, if a mapping is performed on a certain same phone in different sentences of different speakers, it is likely to cause the trained personalized acoustic model is not accurate, thus causing that the synthesized speech is not natural enough.

For the second mode, the decision tree is a shallow model, with limited description ability, especially, when the amount of the speech data of the user is small, such that accuracy of the generated personalized acoustic model is not high, thus resulting in incoherent situations in the predicted parameters, and then making the synthesized speech appear phenomena such as a jumping change, unstable timbre, and the like, and resulting in unnaturalness of the speech.

SUMMARY

Embodiments of the present disclosure seek to solve at least one of the problems existing in the related art to at least some extent.

Accordingly, a first objective of the present disclosure is to provide a method for training personalized multiple acoustic models for speech synthesis. With the method, a requirement for a scale of speech data of a target user can be reduced in a process of training a target user acoustic model, and multiple personalized acoustic models containing speech features of the target user can be trained using a few of user speech data, thus meeting a personalized speech requirement, and improving user experience.

A second objective of the present disclosure is to provide a method for speech synthesis.

A third objective of the present disclosure is to provide a method for speech synthesis.

A fourth objective of the present disclosure is to provide a device for training personalized multiple acoustic models for speech synthesis.

A fifth objective of the present disclosure is to provide a device for speech synthesis.

A sixth objective of the present disclosure is to provide a device for speech synthesis.

To achieve the above objectives, embodiments of a first aspect of the present disclosure provide a method for training personalized multiple acoustic models for speech synthesis, including: training a reference acoustic model based on first acoustic feature data of training speech data and first text annotation data corresponding to the training speech data; obtaining speech data of a target user; training a first target user acoustic model according to the reference acoustic model and the speech data; generating second acoustic feature data of the first text annotation data according to the first target user acoustic model and the first text annotation data; and training a second target user acoustic model based on the first text annotation data and the second acoustic feature data.

To achieve the above objectives, embodiments of a second aspect of the present disclosure provide a method for speech synthesis using the first target user acoustic model in the method according to the embodiments of the first aspect of the present disclosure, including: obtaining a text to be synthesized, and performing word segmentation on the text to be synthesized; performing part-of-speech tagging on the text to be synthesized after the word segmentation, and performing a prosody prediction on the text to be synthesized after the part-of-speech tagging via a prosody prediction model, to generate prosodic features of the text to be synthesized; performing phonetic notation on the text to be synthesized according to a result of the word segmentation, a result of the part-of-speech tagging, and the prosodic features, to generate a result of phonetic notation of the text to be synthesized; inputting the result of phonetic notation, the prosodic features, and context features of the text to be synthesized to the first target user acoustic model, and performing an acoustic prediction on the text to be synthesized via the first target user acoustic model, to generate an acoustic parameter sequence of the text to be synthesized; and generating a speech synthesis result of the text to be synthesized according to the acoustic parameter sequence.

To achieve the above objectives, embodiments of a third aspect of the present disclosure provide a method for speech synthesis using the second target user acoustic model in the method according to the embodiments of the first aspect of the present disclosure, including: obtaining a text to be synthesized, and performing word segmentation on the text to be synthesized; performing part-of-speech tagging on the text to be synthesized after the word segmentation, and performing a prosody prediction on the text to be synthesized after the part-of-speech tagging via a prosody prediction model, to generate prosodic features of the text to be synthesized; performing phonetic notation on the text to be synthesized according to a result of the word segmentation, a result of the part-of-speech tagging, and the prosodic features, to generate a result of phonetic notation of the text to be synthesized; inputting the result of phonetic notation, the prosodic features, and context features of the text to be synthesized to the second target user acoustic model, and performing an acoustic prediction on the text to be synthesized via the second target user acoustic model, to generate an acoustic parameter sequence of the text to be synthesized; and generating a speech synthesis result of the text to be synthesized according to the acoustic parameter sequence.

To achieve the above objectives, embodiments of a fourth aspect of the present disclosure provide a device for training personalized multiple acoustic models for speech synthesis, including: a first model training module, configured to train a reference acoustic model based on first acoustic feature data of training speech data and first text annotation data corresponding to the training speech data; an obtaining module, configured to obtain speech data of a target user; a second model training module, configured to train a first target user acoustic model according to the reference acoustic model and the speech data; a generating module, configured to generate second acoustic feature data of the first text annotation data according to the first target user acoustic model and the first text annotation data; and a third model training module, configured to train a second target user acoustic model based on the first text annotation data and the second acoustic feature data.

To achieve the above objectives, embodiments of a fifth aspect of the present disclosure provide a device for speech synthesis using the first target user acoustic model in the device according to the embodiments of the fourth aspect of the present disclosure, including: an obtaining module, configured to obtain a text to be synthesized; a word segmentation module, configured to perform word segmentation on the text to be synthesized; a part-of-speech tagging module, configured to perform part-of-speech tagging on the text to be synthesized after the word segmentation; a prosody prediction module, configured to perform a prosody prediction on the text to be synthesized after the part-of-speech tagging via a prosody prediction model, to generate prosodic features of the text to be synthesized; a phonetic notation module, configured to perform phonetic notation on the text to be synthesized according to a result of the word segmentation, a result of the part-of-speech tagging, and the prosodic features, to generate a result of phonetic notation of the text to be synthesized; an acoustic prediction module, configured to input the result of phonetic notation, the prosodic features, and context features of the text to be synthesized to the first target user acoustic model, and to perform an acoustic prediction on the text to be synthesized via the first target user acoustic model, to generate an acoustic parameter sequence of the text to be synthesized; and a speech synthesis module, configured to generate a speech synthesis result of the text to be synthesized according to the acoustic parameter sequence.

To achieve the above objectives, embodiments of a sixth aspect of the present disclosure provide a device for speech synthesis using the second target user acoustic model in the device according to the embodiments of the fourth aspect of the present disclosure, including: an obtaining module, configured to obtain a text to be synthesized; a word segmentation module, configured to perform word segmentation on the text to be synthesized; a part-of-speech tagging module, configured to perform part-of-speech tagging on the text to be synthesized after the word segmentation; a prosody prediction module, configured to perform a prosody prediction on the text to be synthesized after the part-of-speech tagging via a prosody prediction model, to generate prosodic features of the text to be synthesized; a phonetic notation module, configured to perform phonetic notation on the text to be synthesized according to a result of the word segmentation, a result of the part-of-speech tagging, and the prosodic features, to generate a result of phonetic notation of the text to be synthesized; an acoustic prediction module, configured to input the result of phonetic notation, the prosodic features, and context features of the text to be synthesized to the second target user acoustic model, and to perform an acoustic prediction on the text to be synthesized via the second target user acoustic model, to generate an acoustic parameter sequence of the text to be synthesized; and a speech synthesis module, configured to generate a speech synthesis result of the text to be synthesized according to the acoustic parameter sequence.

Additional aspects and advantages of embodiments of present disclosure will be given in part in the following descriptions, become apparent in part from the following descriptions, or be learned from the practice of the embodiments of the present disclosure.

DETAILED DESCRIPTION

Figure 1:
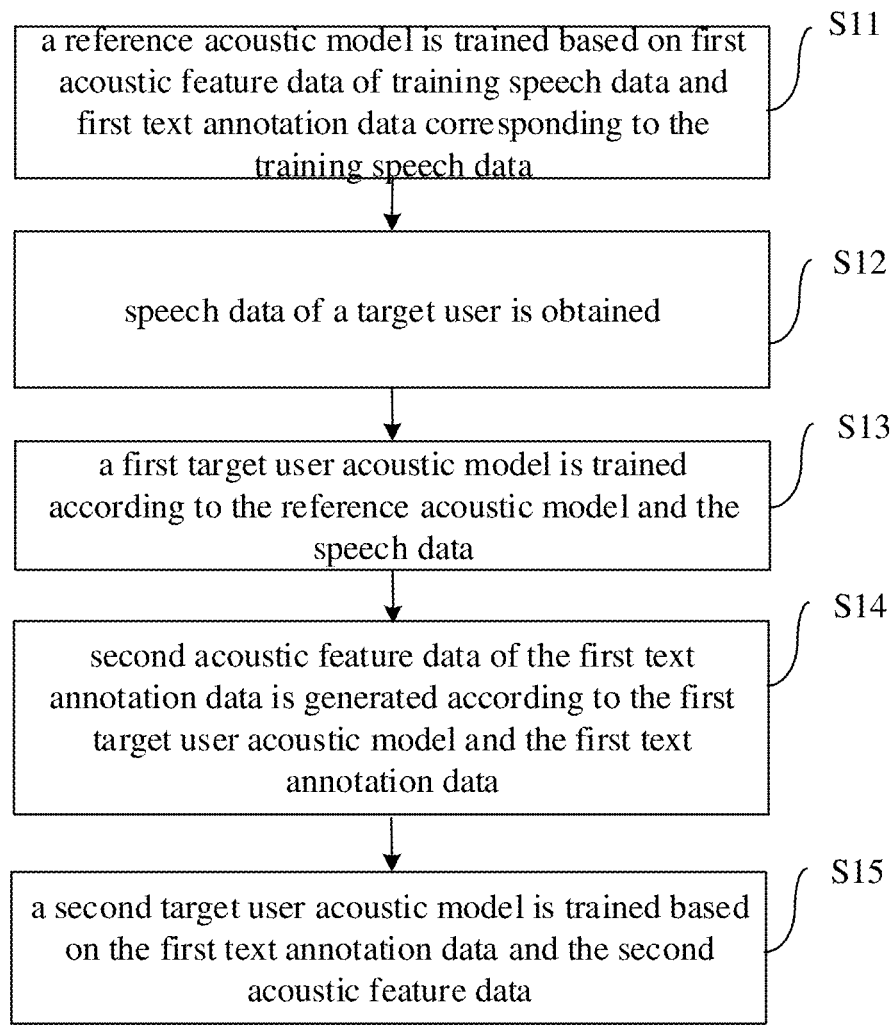
FIG. 1 is a flow chart of a method for training personalized multiple acoustic models for speech synthesis according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A method and a device for training personalized multiple acoustic models for speech synthesis, and a method and a device for speech synthesis are described below with reference to drawings.

FIG. 1 is a flow chart of a method for training personalized multiple acoustic models for speech synthesis according to an embodiment of the present disclosure.

As shown in FIG. 1, the method for training personalized multiple acoustic models for speech synthesis includes the followings.

In step S11, a reference acoustic model is trained based on first acoustic feature data of training speech data and first text annotation data corresponding to the training speech data.

In detail, in order to make the trained reference acoustic model have a well ability a well ability of phone coverage and prosody coverage and can describe a variety of speech phenomena, a certain number of recording text corpuses can be pre-designed. Then, appropriate speakers are selected to obtain larger-scale training speech data of a non-target speaker, the first acoustic feature data of training speech data is extracted, and the recording text corpuses corresponding to the training speech data are annotated to obtain first text annotation data corresponding to the training speech data.

The first acoustic feature data includes acoustic features such as duration, a spectrum, a fundamental frequency, and the like.

The first text annotation data includes text features such as Chinese phoneticize, prosodic hierarchy annotation, and the like.

After the first acoustic feature data of the training speech data and the first text annotation data corresponding to the training speech data are obtained, training can be performed on the first acoustic feature data and the first text annotation data via a neural network, and the reference acoustic model is generated according a result of the training.

In step S12, speech data of a target user is obtained.

The speech data includes speech features of the target user.

In detail, there are many modes for obtaining the speech data of the target user, which can be selected according to demands in practical application. For example, the speech data of the target user can be obtained by a way of live recording, or directly using existing speech data of the target user.

In the following, taking the way of live recording as an example, a process of obtaining the speech data of the target user is described in detail.

Generally, the recording text is pre-designed according to index such as phone coverage and prosody coverage, and then is provided to the target user for reading, to obtain speech data of the target user.

When the recording text (for example, Chinese text) is designed, preferably, the recording text is set to include all initials and finals, so as to improve accuracy of subsequent model training.

It should be noted that, in the present disclosure, a user apparatus can be directly used to record the speech data of the target user, and to perform following operations. Alternatively, after the speech data of the target user is recorded by the user apparatus, it can be sent to a network apparatus, and the following operations are performed by the network apparatus.

It should be noted that, the user apparatus can be a hardware equipment having various operating systems such as a computer, a smart phone, a tablet computer, and the like. The network apparatus includes but is not limited to a single network server, server group composed of multiple network servers, or a cloud composed of a large number of computers or network servers for providing cloud computation.

Further, when the speech data of the target user is recorded, preferably, the speech data of the target user is stored in real time. If the target user can not finish recording of all speech data of the target user at a time, currently recorded speech data of the target user can be stored, and remaining unrecorded speech data of the target user can be recorded in a next time recording.

In step S13, a first target user acoustic model is trained according to the reference acoustic model and the speech data.

After the speech data of the target user is obtained, based on the reference acoustic model, the first target user acoustic model can be trained using the speech data of the target user and via an adaptive technology (for example, via a long short-term memory (LSTM for short) neural network structure or a bidirectional LSTM neural network structure), such that the reference acoustic model is adaptively updated to the first target user acoustic model.

It can be known from the above description that, the reference acoustic model is obtained by training via the neural network structure and based on large-scale training speech data, and the reference acoustic model has a well ability of phone coverage and prosody coverage, and can describe a variety of speech phenomena. Therefore, the reference acoustic model has well built frame structure of the model, for example, a multi-layer neural network structure and connection relationship between neural cells. In this way, when the first target user acoustic model is trained, only a little amount of speech data of the target user is needed, and based on the above mentioned reference acoustic model, the first target user acoustic model can be obtained by adaptive training and updating, such that the first target user acoustic model further has speech features of the target user as well as general information in the reference acoustic model.

Figure 2:
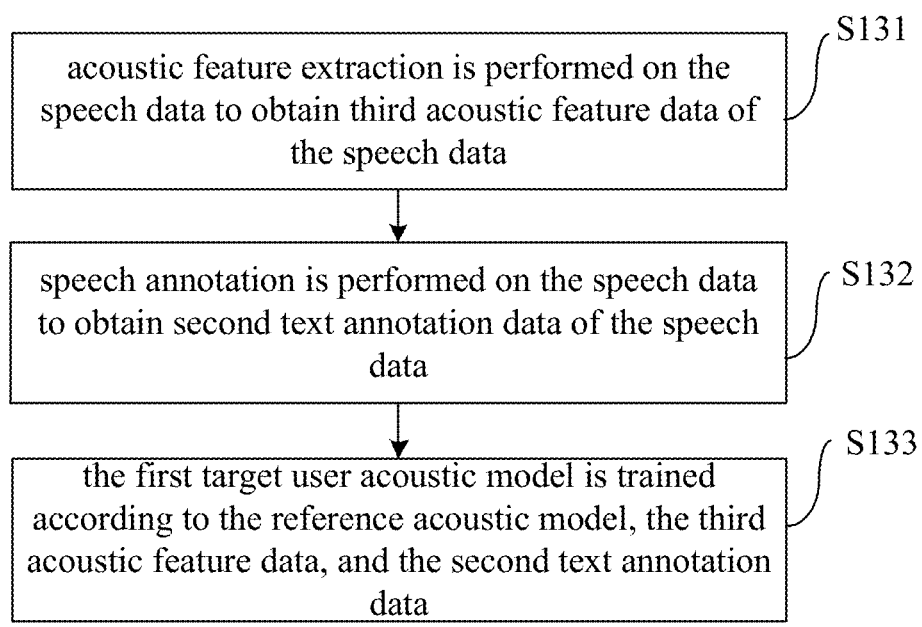
FIG. 2 is a flow chart of step S13.

In detail, in an embodiment of the present disclosure, as shown in FIG. 2, a process of training a first target user acoustic model according to the reference acoustic model and the speech data may include the followings.

In step S131, an acoustic feature extraction is performed on the speech data to obtain third acoustic feature data of the speech data.

Alternatively, before the acoustic feature extraction is performed on the speech data, the method may further include performing pre-processing such as data de-noising, data detection, data filtration and segmentation, and the like on the speech data of the target user, for example, filtering out blank data segment in the speech data of the target user, so as to improve accuracy of the speech data for training the first target user acoustic model.

In detail, acoustic features such as duration, a spectrum, a fundamental frequency, and the like can be extracted from the speech data of the target user.

In step S132, speech annotation is performed on the speech data to obtain second text annotation data of the speech data.

In detail, after the speech data is obtained, speech annotation can be performed on the speech data by a way of automatic recognition or manual annotation to obtain the second text annotation data of the speech data.

The second text annotation data of the speech data includes text features such as Chinese phoneticize, prosodic hierarchy annotation, and the like.

In step S133, the first target user acoustic model is trained according to the reference acoustic model, the third acoustic feature data, and the second text annotation data.

In detail, after the third acoustic feature data and the second text annotation data of the speech data are obtained, a neural network structure of the reference acoustic model can be obtained firstly, and then the first target user acoustic model is trained according to the third acoustic feature data, the second text annotation data, and the neural network structure of the reference acoustic model.

In detail, parameters such as connection weights of neural cells in the neural network structure of the reference acoustic model are updated by performing an iterative operation via neural network adaptive technology according to the third acoustic feature data, the second text annotation data, and the neural network structure of the reference acoustic model, to obtain the first target user acoustic model having speech features of the target user.

In step S14, second acoustic feature data of the first text annotation data is generated according to the first target user acoustic model and the first text annotation data.

In detail, in order to generate a multi-complexity acoustic model and to meet using requirements on different terminals, after the first target user acoustic model is obtained, the first text annotation data for building the reference acoustic model can be input to the first target user acoustic model, to generate the second acoustic featured data corresponding to the first text annotation data. Thus large-scale acoustic feature data having speech features of the target user is obtained.

The second acoustic feature data includes acoustic features such as duration, a spectrum, a fundamental frequency, and the like.

In step S15, a second target user acoustic model is trained based on the first text annotation data and the second acoustic feature data.

In detail, training is performed on the first text annotation data and the second acoustic feature data based on a hidden Markov model (HMM for short), and the second target user acoustic model is built according to a result of the training. The second target user acoustic model obtained by training can well describe personalized speech features in different contexts because the second acoustic feature data has contained the speech features of the target user. Compared with the HMM acoustic models obtained by directly training according to the speech data of the target user, the second target user acoustic model can cover more extensive linguistic phenomena. Further, as computation complexity of applying the second target user acoustic model to a speech synthesis system is much smaller than that of predicting based on the LSTM neural network or the bidirectional LSTM neural network, the second target user acoustic model is well suitable for an apparatus with low computing power.

With the method for training personalized multiple acoustic models for speech synthesis according to embodiments of the present disclosure, firstly a reference acoustic model is trained based on the first acoustic feature data of the training speech data and the first text annotation data corresponding to the training speech data, then the speech data of the target user is obtained, and the first target user acoustic model is trained according to the reference acoustic model and the speech data, then the second acoustic feature data of the first text annotation data is generated according to the first target user acoustic model and the first text annotation data, and finally, the second target user acoustic model is trained based on the first text annotation data and the second acoustic feature data. In this way, in the process of training the user target acoustic model, a requirement for a scale of the speech data of the target user is reduced, from a scale of thousands of sentences to hundreds of or dozens of sentences, for example, that is, multiple personalized acoustic models containing speech features of the target user can be trained using a few of user speech data, thus meeting a personalized speech requirement, and improving user experience.

It can be understood that, the multiple acoustic models obtained by training are applied to a speech synthesis system. In the speech synthesis system, an acoustic model is one of foundations of the whole system. Therefore, after the multiple target user acoustic models are generated by the training method of embodiments of the present disclosure, the multiple acoustic models can be applied to the speech synthesis system. At this time, the user can selectively select a personalized acoustic model used in the speech synthesis system according to his apparatus situation or his will, and the speech synthesis system can perform speech synthesis according to the acoustic model selected by the user.

Accordingly, the present disclosure further provides a method for speech synthesis.

Figure 3:
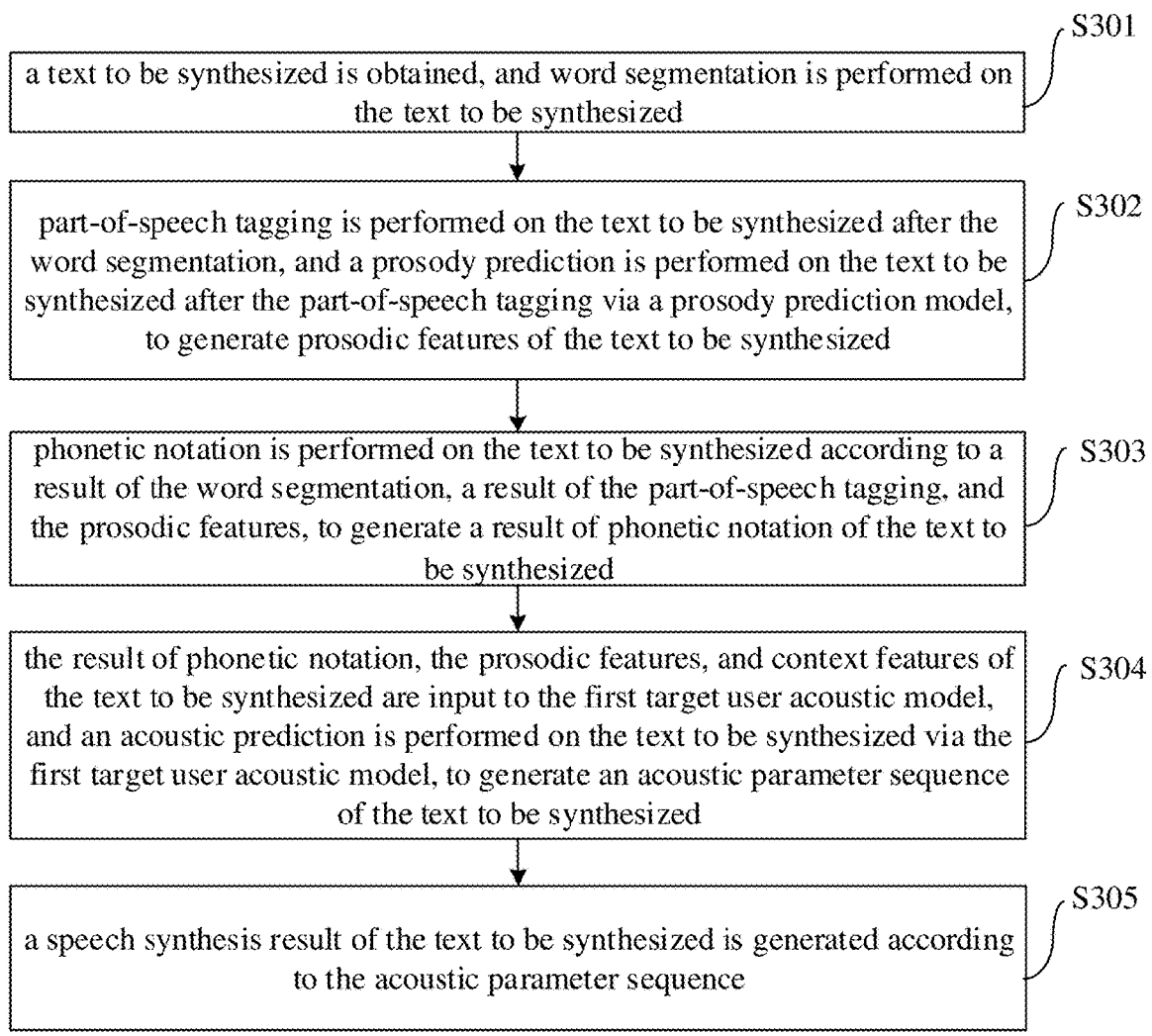
FIG. 3 is a flow chart of a method for speech synthesis according to an embodiment of the present disclosure.

FIG. 3 is a flow chart of a method for speech synthesis according to an embodiment of the present disclosure. In this embodiment, it is supposed that the user selects a first target user acoustic model for speech synthesis. In addition, it should be noted that, the first target user acoustic model used in the method for speech synthesis according to embodiments of the present disclosure is generated by the method for training personalized multiple acoustic models for speech synthesis according to above embodiments.

As shown in FIG. 3, the method for speech synthesis includes the followings.

In step S301, a text to be synthesized is obtained, and word segmentation is performed on the text to be synthesized.

In step S302, part-of-speech tagging is performed on the text to be synthesized after the word segmentation, and a prosody prediction is performed on the text to be synthesized after the part-of-speech tagging via a prosody prediction model, to generate prosodic features of the text to be synthesized.

In step S303, phonetic notation is performed on the text to be synthesized according to a result of the word segmentation, a result of the part-of-speech tagging, and the prosodic features, to generate a result of phonetic notation of the text to be synthesized.

For example, the text to be synthesized is: Our family goes to Shanghai. Literal features and part-of-speech features of the text to be synthesized can be extracted. Then, a phonetic notation dictionary performs the phonetic notation on the text to be synthesized according to the prosodic features, the literal features and the part-of-speech features, to generate the result of phonetic notation of the text to be synthesized.

In step S304, the result of phonetic notation, the prosodic features, and context features of the text to be synthesized are input to the first target user acoustic model, and an acoustic prediction is performed on the text to be synthesized via the first target user acoustic model, to generate an acoustic parameter sequence of the text to be synthesized.

In detail, the result of phonetic notation, the prosodic features, and the context features of the text to be synthesized can be input to an acoustic prediction model, so as to perform the acoustic prediction on the text to be synthesized, and to generate the corresponding acoustic parameter sequence such as duration, a spectrum, fundamental frequency, and the like.

In step S305, a speech synthesis result of the text to be synthesized is generated according to the acoustic parameter sequence.

In detail, a speech signal can be synthesized according to the acoustic parameter sequence using a vocoder, so as to generate the final speech synthesis result.

With the method for speech synthesis according to embodiments of the present disclosure, firstly the text to be synthesized is obtained, the word segmentation is performed on the text to be synthesized, then, the part-of-speech tagging is performed on the text to be synthesized after the word segmentation, and the prosody prediction is performed on the text to be synthesized after the part-of-speech tagging via the prosody prediction model, to generate the prosodic features of the text to be synthesized, and then the phonetic notation is performed on the text to be synthesized according to the result of the word segmentation, the result of the part-of-speech tagging, and the prosodic features, to generate the result of phonetic notation of the text to be synthesized, and the result of phonetic notation, the prosodic features, and context features of the text to be synthesized are input to the first target user acoustic model, the acoustic prediction is performed on the text to be synthesized via the first target user acoustic model, to generate the acoustic parameter sequence of the text to be synthesized, and finally, the speech synthesis result of the text to be synthesized is generated according to the acoustic parameter sequence. In this way, the speech synthesis result of the speech synthesis system includes the features of the target user, thus meeting a requirement for generating personalized speech of the user, and improving user experience.

Figure 4:
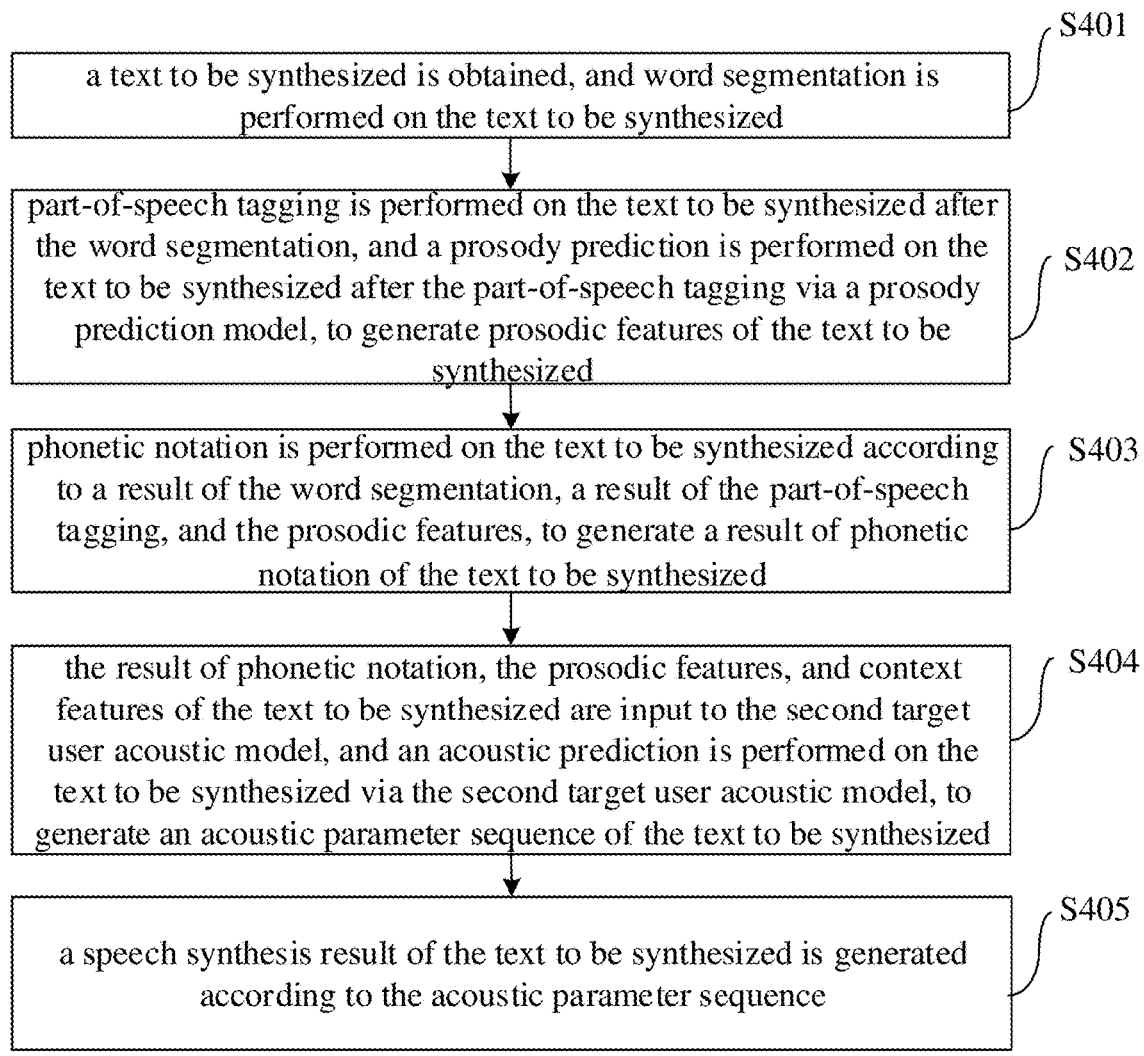
FIG. 4 is a flow chart of a method for speech synthesis according to another embodiment of the present disclosure.

FIG. 4 is a flow chart of a method for speech synthesis according to another embodiment of the present disclosure. In this embodiment, it is supposed that the user selects a second target user acoustic model for speech synthesis. In addition, it should be noted that, the second target user acoustic model used in the method for speech synthesis according to embodiments of the present disclosure is generated by the method for training personalized multiple acoustic models for speech synthesis according to above embodiments.

As shown in FIG. 4, the method for speech synthesis includes the followings.

In step S401, a text to be synthesized is obtained, and word segmentation is performed on the text to be synthesized.

In step S402, part-of-speech tagging is performed on the text to be synthesized after the word segmentation, and a prosody prediction is performed on the text to be synthesized after the part-of-speech tagging via a prosody prediction model, to generate prosodic features of the text to be synthesized.

In step S403, phonetic notation is performed on the text to be synthesized according to the prosodic features, to generate a result of phonetic notation of the text to be synthesized.

For example, the text to be synthesized is: Our family goes to Shanghai. Literal features and part-of-speech features of the text to be synthesized can be extracted. Then, a phonetic notation dictionary performs the phonetic notation on the text to be synthesized according to the prosodic features, the literal features and the part-of-speech features, to generate the result of phonetic notation of the text to be synthesized.

In step S404, the result of phonetic notation, the prosodic features, and context features of the text to be synthesized are input to the second target user acoustic model, and an acoustic prediction is performed on the text to be synthesized via the second target user acoustic model, to generate an acoustic parameter sequence of the text to be synthesized.

In detail, the result of phonetic notation, the prosodic features, and the context features of the text to be synthesized can be input to an acoustic prediction model, so as to perform the acoustic prediction on the text to be synthesized, and to generate the corresponding acoustic parameter sequence such as duration, a spectrum, fundamental frequency, and the like.

In step S405, a speech synthesis result of the text to be synthesized is generated according to the acoustic parameter sequence.

In detail, a speech signal can be synthesized according to the acoustic parameter sequence using a vocoder, so as to generate the final speech synthesis result.

It should be noted that, the second target user acoustic model can cover more extensive linguistic phenomena, therefore, the speech data synthesized via the second target user acoustic model is more accurate.

With the method for speech synthesis according to embodiments of the present disclosure, firstly the text to be synthesized is obtained, the word segmentation is performed on the text to be synthesized, then, the part-of-speech tagging is performed on the text to be synthesized after the word segmentation, and the prosody prediction is performed on the text to be synthesized after the part-of-speech tagging via the prosody prediction model, to generate the prosodic features of the text to be synthesized, and then the phonetic notation is performed on the text to be synthesized according to the result of the word segmentation, the result of the part-of-speech tagging, and the prosodic features, to generate the result of phonetic notation of the text to be synthesized, and the result of phonetic notation, the prosodic features, and context features of the text to be synthesized are input to the second target user acoustic model, the acoustic prediction is performed on the text to be synthesized via the second target user acoustic model, to generate the acoustic parameter sequence of the text to be synthesized, and finally, the speech synthesis result of the text to be synthesized is generated according to the acoustic parameter sequence. In this way, the speech synthesis result of the speech synthesis system includes the features of the target user, thus meeting a requirement for generating personalized speech of the user, and improving user experience.

To realize the above embodiments, the present disclosure further provides a device for training personalized multiple acoustic models for speech synthesis.

Figure 5:
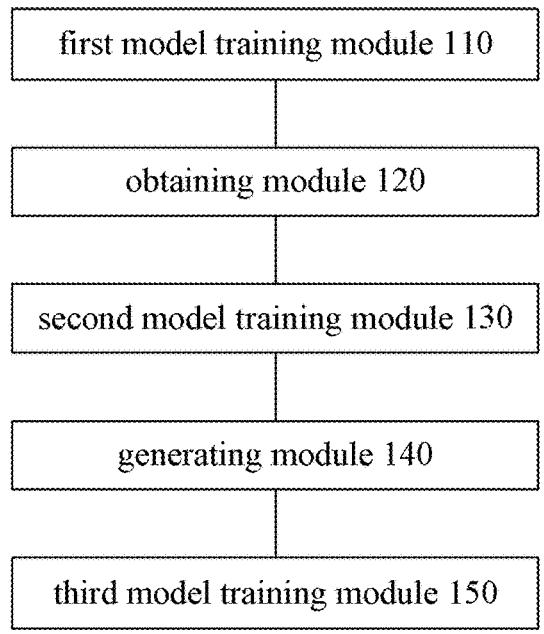
FIG. 5 is a block diagram of a device for training personalized multiple acoustic models for speech synthesis according to an embodiment of the present disclosure.

FIG. 5 is a block diagram of a device for training personalized multiple acoustic models for speech synthesis according to an embodiment of the present disclosure.

As shown in FIG. 5, the device for training personalized multiple acoustic models for speech synthesis includes a first model training module 110, an obtaining module 120, a second model training module 130, a generating module 140, and a third model training module 150.

In detail, the first model training module 110 is configured to train a reference acoustic model based on first acoustic feature data of training speech data and first text annotation data corresponding to the training speech data.

The first acoustic feature data includes acoustic features such as duration, a spectrum, a fundamental frequency, and the like.

The first text annotation data includes text features such as Chinese phoneticize, prosodic hierarchy annotation, and the like.

The obtaining module 120 is configured to obtain speech data of a target user.

In detail, there are many modes for the obtaining module 120 to obtain the speech data of the target user, which can be selected according to demands in practical application. For example, the obtaining module 120 can obtain the speech data of the target user by a way of live recording, or directly using existing speech data of the target user.

The second model training module 130 is configured to train a first target user acoustic model according to the reference acoustic model and the speech data.

In detail, after the obtaining module 120 obtains the speech data of the target user, based on the reference acoustic model, the second model training module 130 can train the first target user acoustic model using the speech data of the target user and via an adaptive technology (for example, via a long short-term memory (LSTM for short) neural network structure or a bidirectional LSTM neural network structure), such that the reference acoustic model is adaptively updated to the first target user acoustic model.

Figure 6:
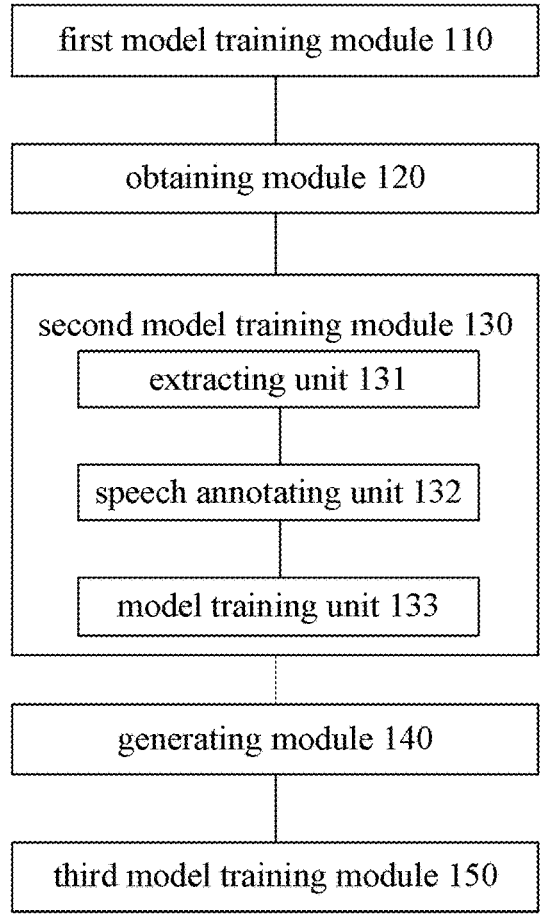
FIG. 6 is a block diagram of a device for training personalized multiple acoustic models for speech synthesis according to another embodiment of the present disclosure.

As shown in FIG. 6, the second model training module 130 includes an extracting unit 131, a speech annotating unit 132, and a model training unit 133.

The extracting unit 131 is configured to perform an acoustic feature extraction on the speech data to obtain third acoustic feature data of the speech data.

The speech annotating unit 132 is configured to perform speech annotation on the speech data to obtain second text annotation data of the speech data.

The model training unit 133 is configured to train the first target user acoustic model according to the reference acoustic model, the third acoustic feature data, and the second text annotation data.

The third acoustic feature data includes acoustic features such as duration, a spectrum, a fundamental frequency, and the like. That is, the extracting unit 131 can extract acoustic features such as duration, a spectrum, a fundamental frequency, and the like from the speech data of the target user.

The second text annotation data of the speech data includes text features such as Chinese phoneticize, prosodic hierarchy annotation, and the like.

The model training unit 133 is configured to obtain a neural network structure of the reference acoustic model, and to train the first target user acoustic model according to the third acoustic feature data, the second text annotation data, and the neural network structure of the reference acoustic model.

The generating module 140 is configured to generate second acoustic feature data of the first text annotation data according to the first target user acoustic model and the first text annotation data.

The second acoustic feature data includes acoustic features such as duration, a spectrum, a fundamental frequency, and the like.

The third model training module 150 configured to train a second target user acoustic model based on the first text annotation data and the second acoustic feature data.

In detail, the third model training module 150 can perform training on the first text annotation data and the second acoustic feature data based on a hidden Markov model, and build the second target user acoustic model according to a result of the training.

It should be noted that, above mentioned description of embodiments of the method for training personalized multiple acoustic models for speech synthesis is also suitable to the device for training personalized multiple acoustic models for speech synthesis, which is not described in detail.

With the device for training personalized multiple acoustic models for speech synthesis according to embodiments of the present disclosure, firstly, a reference acoustic model is trained by the first model training module based on the first acoustic feature data of the training speech data and the first text annotation data corresponding to the training speech data, then the speech data of the target user is obtained by the obtaining module, and the first target user acoustic model is trained by the second model training module according to the reference acoustic model and the speech data, then, the second acoustic feature data of the first text annotation data is generated by the generating module according to the first target user acoustic model and the first text annotation data, and finally, the second target user acoustic model is trained by the third model training module based on the first text annotation data and the second acoustic feature data. In this way, in the process of training the user target acoustic model, a requirement for a scale of the speech data of the target user is reduced, from a scale of thousands of sentences to hundreds of or dozens of sentences, for example, that is, multiple personalized acoustic models containing speech features of the target user can be trained using a few of user speech data, thus meeting a personalized speech requirement, and improving user experience.

To realize the above embodiments, the present disclosure further provides a device for speech synthesis.

Figure 7:
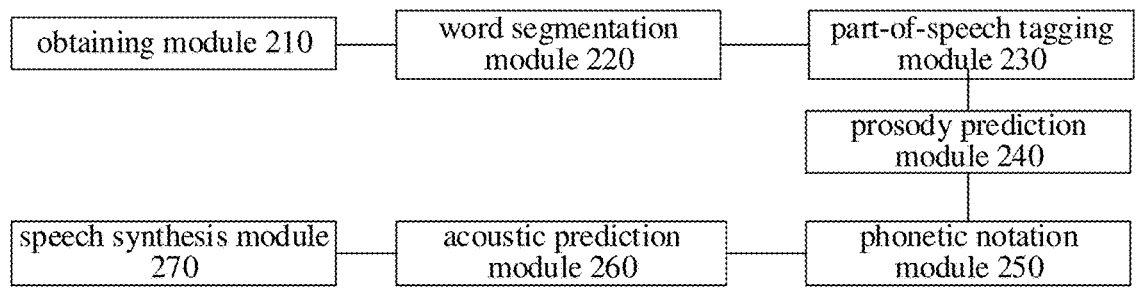
FIG. 7 is block diagram of a device for speech synthesis according to an embodiment of the present disclosure.

FIG. 7 is block diagram of a device for speech synthesis according to an embodiment of the present disclosure. It should be noted that, the first target user acoustic model used in the device for speech synthesis according to embodiments of the present disclosure is generated by the device for training personalized multiple acoustic models for speech synthesis according to any one of above embodiments of the present disclosure.

As shown in FIG. 7, the device for speech synthesis includes an obtaining module 210, a word segmentation module 220, a part-of-speech tagging module 230, a prosody prediction module 240, a phonetic notation module 250, an acoustic prediction module 260, and a speech synthesis module 270.

The obtaining module 210 is configured to obtain a text to be synthesized.

The word segmentation module 220 is configured to perform word segmentation on the text to be synthesized.

The part-of-speech tagging module 230 is configured to perform part-of-speech tagging on the text to be synthesized after the word segmentation, The prosody prediction module 240 is configured to perform a prosody prediction on the text to be synthesized after the part-of-speech tagging via a prosody prediction model, to generate prosodic features of the text to be synthesized.

The phonetic notation module 250 is configured to perform phonetic notation on the text to be synthesized according to a result of the word segmentation, a result of the part-of-speech tagging, and the prosodic features, to generate a result of phonetic notation of the text to be synthesized.

The acoustic prediction module 260 is configured to input the result of phonetic notation, the prosodic features, and context features of the text to be synthesized to the first target user acoustic model, and to perform an acoustic prediction on the text to be synthesized via the first target user acoustic model, to generate an acoustic parameter sequence of the text to be synthesized.

The speech synthesis module 270 is configured to generate a speech synthesis result of the text to be synthesized according to the acoustic parameter sequence.

It should be noted that, above mentioned description of embodiments of the method for speech synthesis is also suitable to the device for speech synthesis, which is not described in detail.

With the device for speech synthesis according to embodiments of the present disclosure, firstly, by the obtaining module, the text to be synthesized is obtained, by word segmentation module, the word segmentation is performed on the text to be synthesized, then, by the part-of-speech tagging module, the part-of-speech tagging is performed on the text to be synthesized after the word segmentation, and by the prosody prediction module, the prosody prediction is performed on the text to be synthesized after the part-of-speech tagging via the prosody prediction model, to generate the prosodic features of the text to be synthesized, and then, by the phonetic notation module, the phonetic notation is performed on the text to be synthesized according to the result of the word segmentation, the result of the part-of-speech tagging, and the prosodic features, to generate the result of phonetic notation of the text to be synthesized, and by the acoustic prediction module, the result of phonetic notation, the prosodic features, and context features of the text to be synthesized are input to the first target user acoustic model, the acoustic prediction is performed on the text to be synthesized via the first target user acoustic model, to generate the acoustic parameter sequence of the text to be synthesized, and finally, by the speech synthesis module the speech synthesis result of the text to be synthesized is generated according to the acoustic parameter sequence. In this way, the speech synthesis result of the speech synthesis system includes the features of the target user, thus meeting a requirement for generating personalized speech of the user, and improving user experience.

To realize the above embodiments, the present disclosure further provides a device for speech synthesis.

Figure 8:
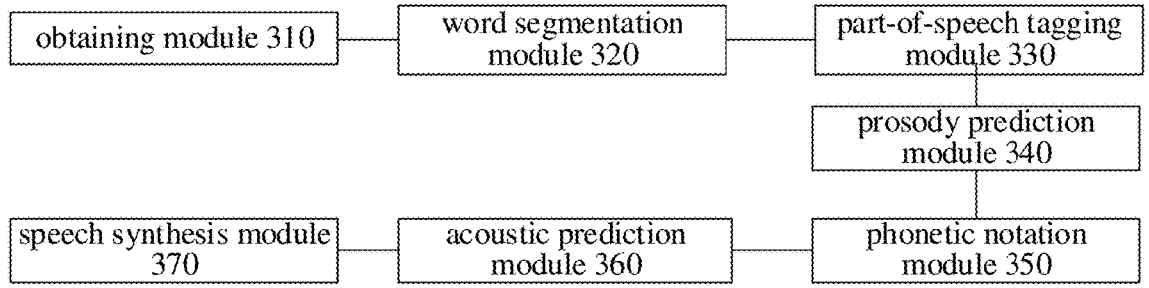
FIG. 8 is block diagram of a device for speech synthesis according to another embodiment of the present disclosure.

FIG. 8 is block diagram of a device for speech synthesis according to another embodiment of the present disclosure. It should be noted that, the second target user acoustic model used in the device for speech synthesis according to embodiments of the present disclosure is generated by the device for training personalized multiple acoustic models for speech synthesis according to any one of above embodiments of the present disclosure.

As shown in FIG. 8, the device for speech synthesis includes an obtaining module 310, a word segmentation module 320, a part-of-speech tagging module 330, a prosody prediction module 340, a phonetic notation module 350, an acoustic prediction module 360, and a speech synthesis module 370.

The obtaining module 310 is configured to obtain a text to be synthesized.

The word segmentation module 320 is configured to perform word segmentation on the text to be synthesized.

The part-of-speech tagging module 330 is configured to perform part-of-speech tagging on the text to be synthesized after the word segmentation.

The prosody prediction module 340 is configured to perform a prosody prediction on the text to be synthesized after the part-of-speech tagging via a prosody prediction model, to generate prosodic features of the text to be synthesized.

The phonetic notation module 350 is configured to perform phonetic notation on the text to be synthesized according to a result of the word segmentation, a result of the part-of-speech tagging, and the prosodic features, to generate a result of phonetic notation of the text to be synthesized.

The acoustic prediction module 360 is configured to input the result of phonetic notation, the prosodic features, and context features of the text to be synthesized to the second target user acoustic model, and to perform an acoustic prediction on the text to be synthesized via the second target user acoustic model, to generate an acoustic parameter sequence of the text to be synthesized.

The speech synthesis module 370 is configured to generate a speech synthesis result of the text to be synthesized according to the acoustic parameter sequence.

It should be noted that, above mentioned description of embodiments of the method for speech synthesis is also suitable to the device for speech synthesis, which is not described in detail.

With the device for speech synthesis according to embodiments of the present disclosure, firstly, by the obtaining module, the text to be synthesized is obtained, by the word segmentation module, the word segmentation is performed on the text to be synthesized, then, by the part-of-speech tagging module, the part-of-speech tagging is performed on the text to be synthesized after the word segmentation, and by the prosody prediction module, the prosody prediction is performed on the text to be synthesized after the part-of-speech tagging via the prosody prediction model, to generate the prosodic features of the text to be synthesized, and then by phonetic notation module, the phonetic notation is performed on the text to be synthesized according to the result of the word segmentation, the result of the part-of-speech tagging, and the prosodic features, to generate the result of phonetic notation of the text to be synthesized, and the result of phonetic notation, the prosodic features, and context features of the text to be synthesized are input by the acoustic prediction module to the second target user acoustic model, the acoustic prediction is performed on the text to be synthesized via the second target user acoustic model, to generate the acoustic parameter sequence of the text to be synthesized, and finally, by the speech synthesis module, the speech synthesis result of the text to be synthesized is generated according to the acoustic parameter sequence. In this way, the speech synthesis result of the speech synthesis system includes the features of the target user, thus meeting a requirement for generating personalized speech of the user, and improving user experience.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for training personalized multiple acoustic models for speech synthesis, comprising:
   training a reference acoustic model based on first acoustic feature data of training speech data and first text annotation data corresponding to the training speech data;
   obtaining speech data of a target user;
   training a first target user acoustic model according to the reference acoustic model and the speech data;
   generating second acoustic feature data of the first text annotation data according to the first target user acoustic model and the first text annotation data; and
   training a second target user acoustic model based on the first text annotation data and the second acoustic feature data.

2. The method according to claim 1, wherein training a first target user acoustic model according to the reference acoustic model and the speech data comprises:
performing an acoustic feature extraction on the speech data to obtain third acoustic feature data of the speech data;
performing speech annotation on the speech data to obtain second text annotation data of the speech data; and
training the first target user acoustic model according to the reference acoustic model, the third acoustic feature data, and the second text annotation data.

3. The method according to claim 2, wherein training the first target user acoustic model according to the reference acoustic model, the third acoustic feature data, and the second text annotation data comprises:
obtaining a neural network structure of the reference acoustic model; and
training the first target user acoustic model according to the third acoustic feature data, the second text annotation data, and the neural network structure of the reference acoustic model.

4. The method according to claim 1, wherein training a second target user acoustic model based on the first text annotation data and the second acoustic feature data, comprises:
performing training on the first text annotation data and the second acoustic feature data based on a hidden Markov model, and building the second target user acoustic model according to a result of the training.

5. A method for speech synthesis using a second target user acoustic model, wherein the second target user acoustic model is obtained by training a reference acoustic model based on first acoustic feature data of training speech data and first text annotation data corresponding to the training speech data; obtaining speech data of a target user; training the first target user acoustic model according to the reference acoustic model and the speech data, generating second acoustic feature data of the first text annotation data according to the first target user acoustic model and the first text annotation data; and training the second target user acoustic model based on the first text annotation data and the second acoustic feature data;
the method for speech synthesis comprises:
obtaining a text to be synthesized, and performing word segmentation on the text to be synthesized;
performing part-of-speech tagging on the text to be synthesized after the word segmentation, and performing a prosody prediction on the text to be synthesized after the part-of-speech tagging via a prosody prediction model, to generate prosodic features of the text to be synthesized;
performing phonetic notation on the text to be synthesized according to a result of the word segmentation, a result of the part-of-speech tagging, and the prosodic features, to generate a result of phonetic notation of the text to be synthesized;
inputting the result of phonetic notation, the prosodic features, and context features of the text to be synthesized to the second target user acoustic model, and performing an acoustic prediction on the text to be synthesized via the second target user acoustic model, to generate an acoustic parameter sequence of the text to be synthesized; and
generating a speech synthesis result of the text to be synthesized according to the acoustic parameter sequence.

6. The method according to claim 1, wherein obtaining speech data of a target user comprises:
designing recording text according to phone coverage and prosody coverage;
providing the recording text to the target user; and
receiving the speech data of the recording text read by the target user.

7. The method according to claim 2, wherein training a first target user acoustic model according to the reference acoustic model and the speech data further comprises:
performing pre-processing on the speech data of the target user, wherein the pre-processing comprises data denoising, data detection, data filtration and segmentation.

8. The method according to claim 2, wherein training the first target user acoustic model according to the reference acoustic model, the third acoustic feature data, and the second text annotation data comprises:
obtaining a neural network structure of the reference acoustic model;
updating parameters in the neural network structure of the reference acoustic model by performing an iterative operation via a neural network adaptive technology according to the third acoustic feature data, the second text annotation data and the neural network structure of the reference acoustic model, to obtain the first target user acoustic model.

9. The method according to claim 1, wherein training a second target user acoustic model based on the first text annotation data and the second acoustic feature data comprises:
performing training on the first text annotation data and the second acoustic feature data based on a hidden Markov model; and
building the second target user acoustic model according to a result of the training.

10. The method according to claim 2, wherein training the first target user acoustic model according to the reference acoustic model, the third acoustic feature data, and the second text annotation data comprises:
obtaining a neural network structure of the reference acoustic model; and
training the first target user acoustic model according to the third acoustic feature data, the second text annotation data, and the neural network structure of the reference acoustic model.

11. The method according to claim 2, wherein training a second target user acoustic model based on the first text annotation data and the second acoustic feature data, comprises:
performing training on the first text annotation data and the second acoustic feature data based on a hidden Markov model, and building the second target user acoustic model according to a result of the training.

12. The method according to claim 3, wherein training a second target user acoustic model based on the first text annotation data and the second acoustic feature data, comprises:
performing training on the first text annotation data and the second acoustic feature data based on a hidden Markov model, and building the second target user acoustic model according to a result of the training.

* * * * *